Figure 1:
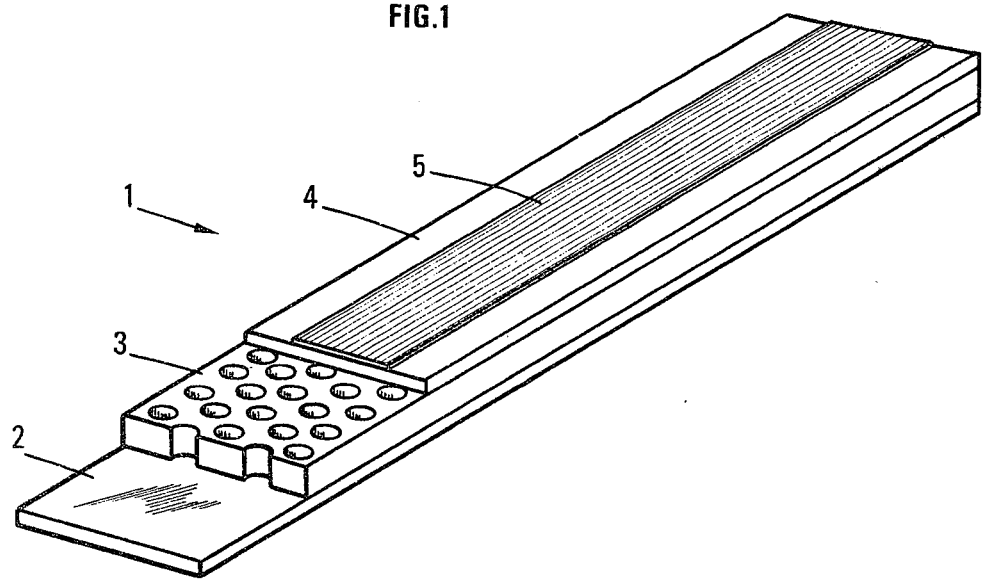

United States Patent [19]

Dubois

[11] 4,245,329
[45] Jan. 13, 1981

[54] ELONGATED SEISMIC RECEIVER OF CONTINUOUS STRUCTURE

[75] Inventor: Jean-Claude Dubois, Royan, France

[73] Assignee: Institut Francais du Petrole, France

[21] Appl. No.: 830,217

[22] Filed: Sep. 2, 1977

Related U.S. Application Data

[63] Continuation-in-part of Ser. No. 578,185, May 16, 1975, abandoned.

[30] Foreign Application Priority Data

May 17, 1974 [FR] France .............................. 74 17545

[51] Int. Cl.³ .......................................... H04B 11/00
[52] U.S. Cl. ................................... 367/140; 367/170
[58] Field of Search ............................. 340/17 R, 7 R; 179/111 E; 307/88 ET, 400; 367/140, 178, 170

[56] References Cited

U.S. PATENT DOCUMENTS

| 3,736,436 | 5/1973 | Crites | 179/111 E X |
| 3,787,642 | 1/1974 | Young, Jr. | 179/111 E |
| 3,798,474 | 3/1974 | Cassand et al. | 340/10 X |

OTHER PUBLICATIONS

Sessler et al., *The Foil-Electret Microphone*, Bell Laboratories Record, 8-69, vol. 47, No. 7, pp. 245-248.

*Primary Examiner*—Theodore M. Blum
*Attorney, Agent, or Firm*—Craig & Antonelli

[57] ABSTRACT

Elongated receiver of continuous structure for seismic prospecting comprising at least one sensitive assembly having two electrically conducting electrodes on both sides of a deformable element subjected to a permanent electric polarization and an electrically insulating compressible element between the deformable element and one of the electrodes. When used for prospecting on the earth the receiver further comprises masses of heavy material secured to one face of the sensitive assembly.

43 Claims, 17 Drawing Figures

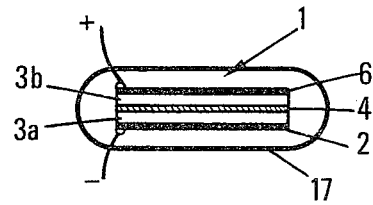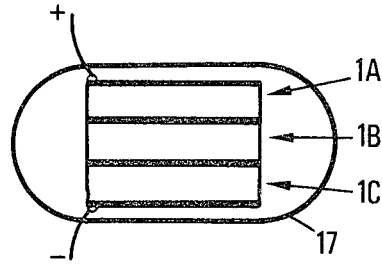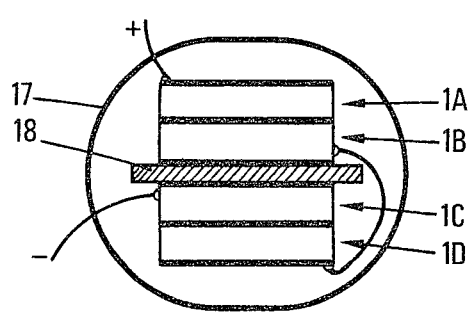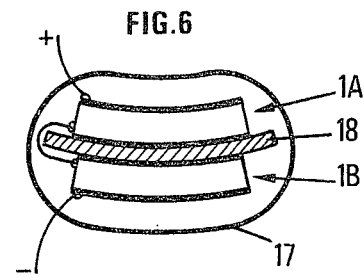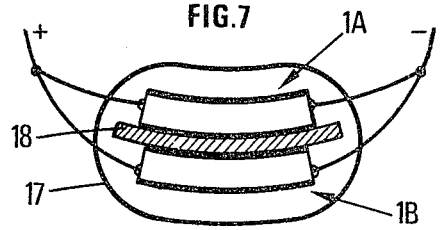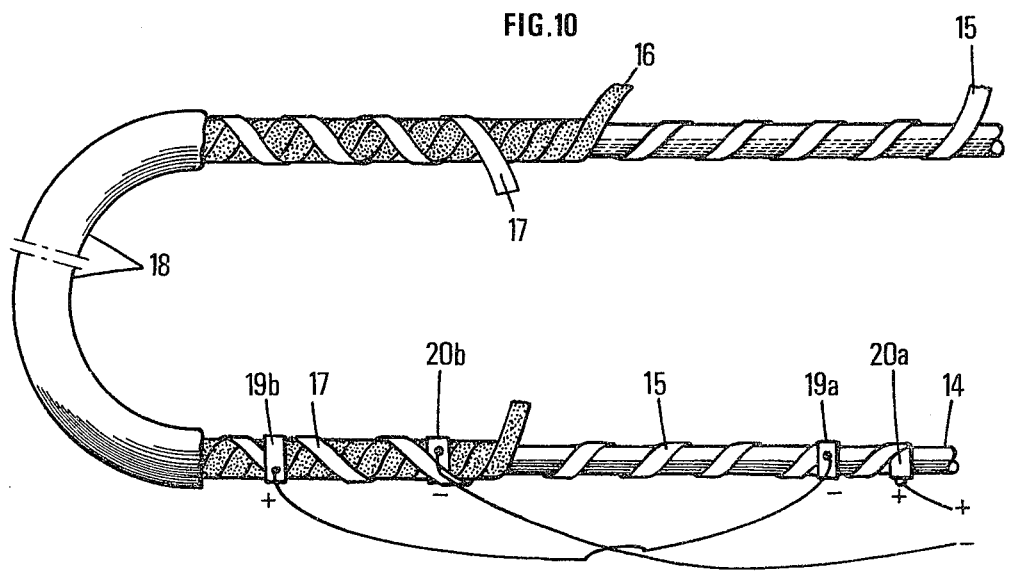

ELONGATED SEISMIC RECEIVER OF CONTINUOUS STRUCTURE

This is a continuation-in-part application of application Ser. No. 578,185, filed on May 16, 1975 abandoned.

This invention has for object an elongated seismic receiver of continuous structure.

The prior art in the field of sensors of great length and continuous structure may be illustrated by the U.S. Pat. No. 2,649,579, in which is described a seismic wave sensor of the capacitive type for use in seismic prospecting on the earth. It comprises an elongated closed and flat envelope, provided with two opposite surfaces made internally solid with two flexible electrodes, spaced apart from each other, by means of air blown into envelope. The seismic motions transmitted to the earth surface on which the sensor is laid, change the relative spacing of the two electrodes and, consequently, generate an electric voltage therebetween. The two electrodes may be polarized by connecting them to the terminals of a voltage generator.

The receiver of the invention is particularly useful for measuring the pressure variations resulting from seismic vibrations either in the sea or on the earth.

It comprises a flat sensitive element having two electrodes made of a conducting material and placed on both sides of a deformable element subjected to a permanent electric polarization. This receiver is remarkable in that each sensitive element comprises an electrically insulating compressible element placed between the deformable element and at least one of the electrodes.

Figure 2:
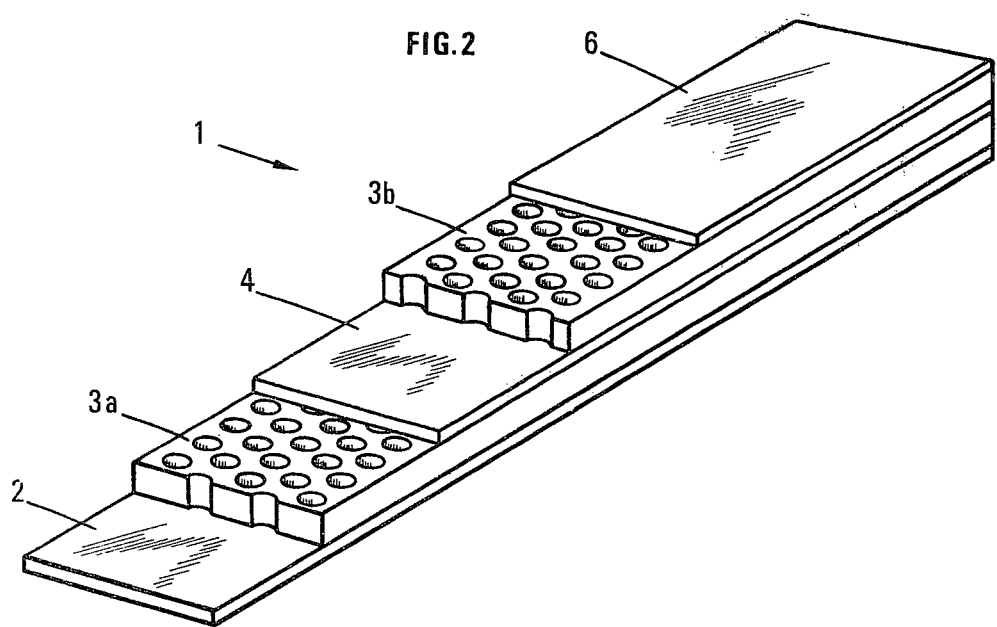
Figure 8:
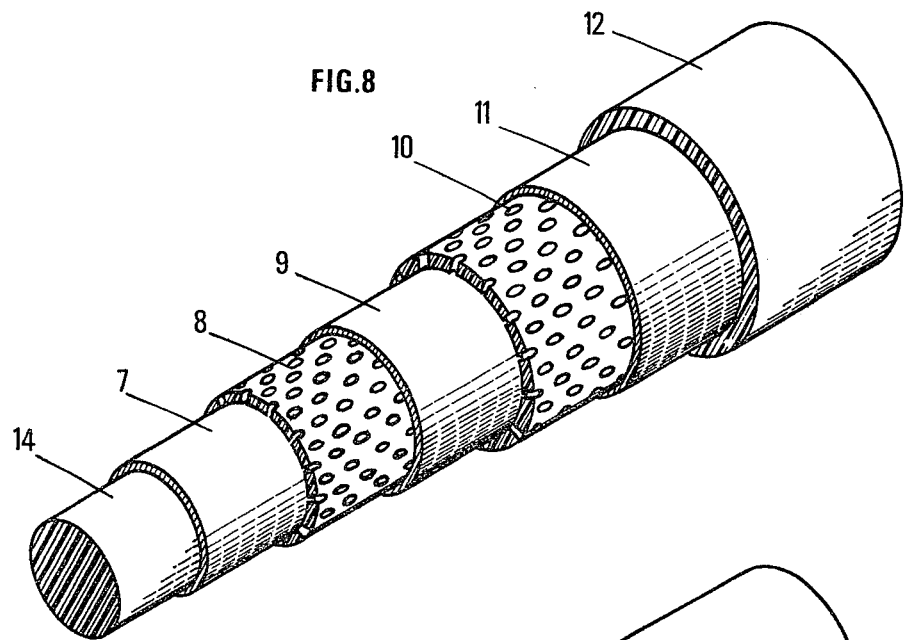
Figure 9:
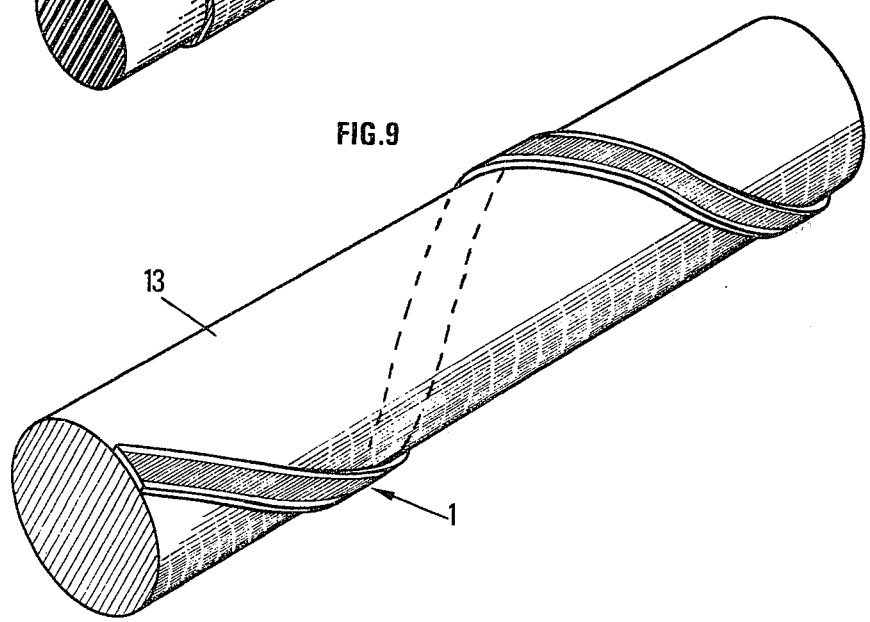

The advantages of the invention as well as other specific features of the device will be made apparent from the following description with reference to the accompanying drawings in which:

FIG. 1 diagrammatically shows a first embodiment of a flat shaped device according to the invention, FIG. 2 diagrammatically shows a second embodiment of a flat shaped device, FIG. 3 is a cross-sectional view of the sensor of FIG. 2, FIG. 4 is a cross-sectional view of a third embodiment of the device in the form of pilings of the same polarity, FIG. 5 is a cross-sectional view of a fourth embodiment of the device in the form of pilings of inverse polarity, FIG. 6 diagrammatically shows an alternative embodiment of the device comprising two sensitive elements associated with their electrodes, of the same polarity, secured on both sides of an insulating strip and connected in series, FIG. 7 shows an alternative embodiment of the device in which the sensitive elements are arranged in the same manner as in FIG. 6, the electrodes being connected in parallel, FIG. 8 is a cross-sectional view of a fifth embodiment of the device in which the different elements have a cylindrical shape, FIG. 9 is a cross-sectional view of a sixth embodiment of the device in which one of the electrodes and the two sensitive elements are wound up on a cylindrical electrode, FIG. 10 diagrammatically shows a seventh embodiment of the device comprising assemblies of the type shown in FIGS. 1 and 2, wound up in helices of opposite directions.

Figure 12:
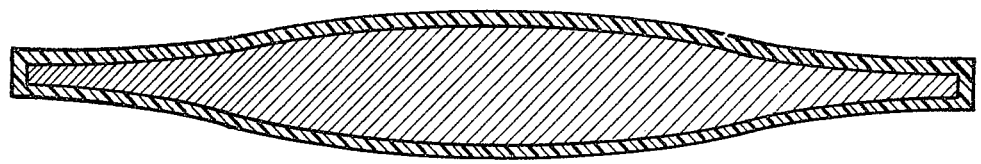
Figure 11:
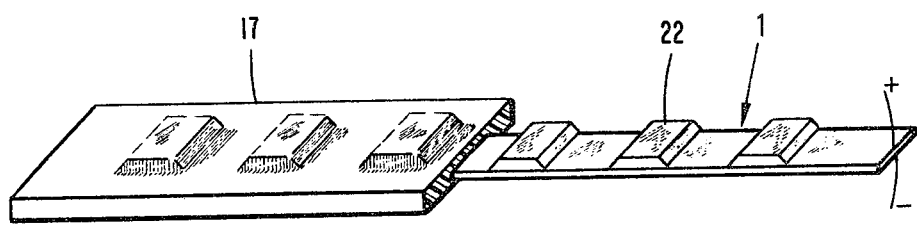
Figure 13:
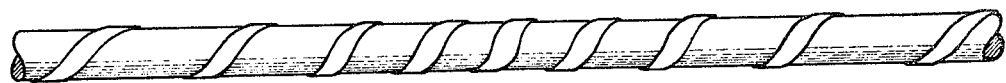

FIG. 11 diagrammatically shows an alternative embodiment of the assembly illustrated in FIGS. 1 and 2, specifically adapted for use on the earth, FIG. 12 diagrammatically shows an alternative embodiment of the assembly illustrated in FIGS. 1 and 2, with a varying width, FIG. 13 diagrammatically shows a sensor of the type illustrated in FIG. 9, with two elements and one of the electrodes wound up in helices of variable pitch, FIG. 14 shows an eighth embodiment of the device of the invention, FIG. 15 shows the first variant of the ninth embodiment, FIG. 16 shows a second variant of the ninth embodiment, and FIG. 17 shows a tenth embodiment of the device of the invention.

The sensor illustrated in FIG. 1 comprises an assembly 1 of three elongated flat elements whose length is considerably greater than their widths. It comprises a first armature or electrode consisting of a metal strip or stranded or braided metal 2 solid with an element 3 made of electrically insulating material. The structure of said element (or of the material of which it is formed) is so selected that it be compressible, i.e. that its volume varies when it is subjected to stresses. By way of non limitative examples, the insulating element may be in the form of a grid, for example, a perforated strip or a strip made by weaving.

The insulating element is covered with a deformable element 4 having a permanent electric polarization. There can be used, for example, an element formed of a material known as "electret." This material is obtained, for example, by polarizing strips of a thickness from 8 to 25 microns and made of plastic material of the type of polypropylene, polytetrafluoroethylene, polyethylene terephthalate, etc. This polarization is achieved by electronic bombardment obtained by application of an electric field with the material being heated to a temperature close to its softening point, by Corona effect, by ultraviolet radiation, etc.

The "electret" strip is itself coated with a metal layer 5 forming a second armature or electrode.

When mechanical stresses are applied to the piling of the three elements 1, 2 and 3, the "electret" strip is displaced with respect to the electrodes and the internal electric field polarizing it induces electric charges on the electrodes. Accordingly, variations of the electric voltage between the two electrodes is observed.

Electric conductors, not shown, connect the electrodes to apparatuses for recording the voltage variations sensed by means of a potential transformer or a preamplifying adaptor, also not shown.

In the embodiment shown in FIGS. 2 and 3, the assembly 1 comprises a piling formed of an "electret" strip 4, each face of which is separated from two flat metal strips, 2, 6, acting as electrodes, by means of two strips 3a and 3b, similar to strip 3 shown in FIG. 1. The piling may be coated with an insulating sheath 17 of flexible material.

According to the third embodiment illustrated in FIG. 4, it is advantageous to pile up three assemblies 1A, 1B, 1C, identical to assembly 1 of FIG. 3, or more generally, any number of such assemblies and to connect them in series.

The sensitivity of the device is thus increased while its capacity is decreased.

Other embodiments of sensor are adapted to avoid the disadvantages resulting from flexion. When a flexible sensor is bent, certain zones thereof undergo expansions and other compressions. Electric charges are generated in said zones and disturb the seismic information.

According to the embodiment illustrated in FIG. 5, two sensing assemblies of the type shown in FIGS. 2 and 3, have been associated and placed on both sides of a strip 18 of flexible insulating material. In the case where the sensing assemblies placed on both sides of the insulating strip 18 are not rigidly connected thereto, they are subjected substantially to the same flexion and produce electric charges of the same sign if their polarity is in the same direction. In order to nullify these parasitic charges, it suffices to reverse said polarity, as illustrated in FIG. 5.

Two sensors made solid with each other, undergo, when they are subjected to a flexion stress, respectively a compression and an expansion, and deliver parasitic electric charges of opposite signs.

The polarity of the two sensors must accordingly, in this case, have the same orientation in order to nullify the parasitic charges. This case is illustrated in FIG. 6 where the electrodes are connected in series and FIG. 7 where the electrodes are connected in parallel.

In the embodiment illustrated in FIG. 8, the assembly of sensors has a cylindrical shape. By way of example, it comprises piling of elements of the same type as that described in FIGS. 1 or 2. From the center to the periphery, it successively comprises a central core 14 made of flexible insulating plastic material externally covered with a flexible electrode 7 which may consist of a metal coating deposited on the external surface of the central core 14, followed with a first insulating grid 8, an "electret" sensitive element 9, a second insulating grid 10, a second conducting electrode 11 and a flexible insulating external sheath 12.

In the embodiment of FIG. 9, the assembly formed by the piling of the insulating grid 3, the "electret" strip 4 and the metal coating 5 (c.f. FIG. 1) is wound up in helices of constant pitch on the central core 13 of cylindrical shape made of a conducting material.

The sensor illustrated in FIG. 10 mainly comprises an insulating central core 14 around which is wound a sensing assembly 15 of the type illustrated in FIGS. 1 or 2. This assembly is covered with an insulating element, for example, a strip 16 of insulating flexible material superimposed by winding on the sensing assembly 15. A second sensing assembly 17, identical to the first one 15, a helically wound but in a reverse direction with respect to that of the first assembly, onto the insulating strip 16. The electrodes of the two sensing assemblies 15 and 17 are connected in parallel through rings 19a, 19b, 20a, 20b and connected to a measuring circuit, not shown.

The structure of this sensor embodiment has the advantage of providing for a double compensation of the flexion effects: on the one hand, the compensation according to the principle illustrated in FIG. 5, resulting from the opposite polarities of the electrodes and, on the other hand, a compensation resulting from the fact that, over a given length of the device subjected to a flexion, the number of convolution portions, subjected to a traction stress is the same as the number of convolution portions subjected to a compression stress. The number of convolutions is, of course, not limitative. More generally, one or more sensing assemblies may be wound around core 14 and connected in the manner illustrated in FIGS. 4 and 5.

The above-described embodiments of sensor are particularly adapted for measurements in water.

The receiver of continuous structure according to the invention, may however, be adapted to the use on the earth as illustrated in FIG. 11. In this case, there is used a sensing assembly of flat shape of the type illustrated in FIGS. 1 to 4 to 5, and one of its faces is provided with small masses 22, e.g. of lead, having the object of generating a reaction force, whereby the variations of the ground velocity transmitted to the sensor, are converted to force variations, consequently in pressure variations, applied to the sensor. Moreover, said masses make easier the contact of the sensor with the earth. These small masses may be placed, for example, inside a flexible sheath 17 which hold them in position.

The sensor may also be designed so as to weight the sensitivity in different zones thereof by the distance of these zones to the center of the device, so as to improve its directivity. For example, in the case of a sensing assembly in form of a strip, the width of said strip may be varied and for example greater near the center of the sensor than at the ends thereof (FIG. 12).

In the case of a sensor of cylindrical shape, the winding pitch may be varied from one zone of the sensing assembly to another. The winding pitch will be greater at the end parts of the sensing assembly than near the center thereof where a greater concentration of convolutions will be achieved (FIG. 13).

In the embodiment of FIG. 14, the assembly of the first electrode and the compressible element is replaced by a flat element 21 of conducting material having regularly spaced inequalities in the surface formed by recesses of a parallelepipedic, pyramidal or cylindrical shape or in the form of a sphere portion etc. These inequalities in the surface may be produced:

by adding a material on a flat strip, e. g. by depositing a metal by electrolysis or a varnish by means of a screen;
by mechanical or chemical engraving of the surfaces of a flat metal strip; or
by milling or stamping.

The element 21 forms an electrode or armature. The second electrode is a metal film 5 in contact with the electret 4. During the manufacturing operations, the electret strip is disposed on the element 21 and the air contained in the recesses is trapped. The volume defined between element 21 and the facing surface of the electret strip varies in response to the stresses exerted on the other electrode. Accordingly, the element 21 acts similarly as a perforated strip of lattice structure used in the other described embodiments.

According to the above embodiments, when the stresses are applied to the sensitive assembly, the second electrode and the electret film are deformed and, accordingly, the distance between the electrodes varies. The electric field permanently generated by the electret film thus induces a voltage between the electrodes.

The electret film has in said arrangement, a double action: that of generating an electric field and that of transmitting mechanical deformations.

It happens that certain materials used in the manufacture of the electret film (polytetrafluoroethylene, for example) have insufficient mechanical properties for accurately transmitting the mechanical stresses to which they are subjected.

According to certain embodiments, the metal film forming the second electrode consists of a deposit made under vacuum on the surface of the electret film.

It also happens that the surface metallization of certain dielectric films degrades the electric properties of the material by diffusing metal ions during the metallization, under vacuum for example. Non-metallized electret films are then preferably used.

The embodiments described hereunder permit, in these unfavorable cases, to avoid the above-mentioned drawbacks.

The embodiment of FIG. 15 comprises a flat metal strip 2, relatively thick, sufficiently flexible for being wound but which may be considered as locally rigid. This strip forms the first electrode or armature. On this strip is laid, sticked or welded a relatively thin electret film 4 which is covered with an electrically insulating and compressible element 3 consisting of a strip made of a rigid material and regularly perforated. Another electrode or armature is disposed on the insulating element. The second electrode consists of a metallic membrane 6 having a thickness of about a few microns. The metal this membrane is made of is selected in accordance with the desired sensitivity.

The second electrode may also consist of a film of thin plastic material, metallized on one of its faces. The mechanical properties of the plastic material of which the film is made are such that the latter can be used as membrane accurately transmitting the stresses exerted thereon. As plastic material there will be selected for example polypropylene, a polycarbonate, a polyethylene terephthalate etc. The thickness of the film is preferably selected from 8 to 25 microns. The metallized surface is so placed as to face the electret film.

A first variant of the embodiment of FIG. 15 consists of replacing the punched strip 3 with a strip of lattice structure (FIG. 16) made of plastic or woven material.

Second variant of the embodiment of FIG. 15 consists of replacing the punched strip 3 with a strip made of compressible plastic material (for example cellular material).

In the two above variants, the second electrode or armature may also consist either of a metallic membrane or of a thin plastic film metallized on one of its faces.

In the embodiments of FIGS. 15 to 17, the electret film is not used as mechanical transmission agent, but only for generating an electric field. The deformations resulting from the stresses are transmitted only through the compressible element and the external armature or electrode.

Moreover, the second electrode, optionally formed by metallization, is in contact with the compressible element and not with the electret.

The above-described embodiments may be subjected to the same combinations as those illustrated in FIGS. 3 to 7: connection in series of two sensitive assemblies by direct contact between their thick electrodes, and connection in series or in parallel of several sensitive assemblies, stacked with interposition of flexible insulating strips, in order to substantially nullify by compensation the parasitic signals due to bending.

Other embodiments may be performed without departing from the scope of the invention.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

I claim:

1. A receiver of continuous structure for seismic prospecting comprising at least one pair of sensitive elements, each of said sensitive elements including two electrodes, made of a conducting material, placed at opposite sides of a deformable element subjected to a permanent electric polarization and at least one adjacent electrically insulating compressible element, and said pair of sensitive elements being separated by an insulating element, the respective electrodes of the sensitive elements being at opposite polarities.

2. A receiver of continuous structure for seismic prospecting comprising at least one pair of sensitive elements, each of said sensitive elements including two electrodes, made of a conducting mateial, placed at opposite sides of a deformable element subjected to a permanent electric polarization and at least one adjacent insulating compressible element, and each sensitive element having a cylindrical shape, both elements of one pair being wound in helices of opposite directions around an insulating central core.

3. A receiver of continuous structure for seismic prospecting comprising at least one sensitive element including two electrodes, made of a conducting material, placed at opposite sides of a deformable element subjected to a permanent electric polarization and at least one adjacent electrically insulating compressible element, in which the sensitive element is narrower at its end parts than at its center.

4. A receiver of continuous structure for seismic prospecting comprising at least one sensitive element including two electrodes, made of a conducting material, placed at opposite sides of a deformable element subjected to a permanent electric polarization and at least one adjacent electrically insulating compressible element, said sensitive element having a cylindrical shape in which at least one sensitive element is wound helically around a central core of great length, made of a flexible and electrically insulated material, the winding pitch of the assembly being smaller at the center than at the ends of the receiver.

5. A pressure transducer for underwater seismic prospecting comprising at least one sensitive element including two electrodes of a conducting material disposed at opposite sides of a deformable member having a permanent electric polarization which is adjacent to at least one electrically insulating member capable of undergoing substantial volume reduction in response to pressure stresses.

6. A pressure transducer comprising several sensitive elements, each including two electrodes of a conducting material disposed at opposite sides of a deformable member having a permanent electric polarization which is adjacent to at least one electrically insulating compressible member, wherein said sensitive elements are superimposed and electrically interconnected.

7. A pressure transducer comprising at least one sensitive element including two electrodes of a conducting material disposed at opposite sides of a deformable member having a permanent electric polarization which is adjacent to at least one electrically insulating compressible member, further comprising at least one pair of said sensitive elements, rigidly connected to a flexible support, the respective electrodes of both elements having the same polarities.

8. A pressure transducer according to claim 6, wherein the sensitive elements have a cylindrical shape.

9. A pressure transducer comprising at least one sensitive element including two electrodes of a conducting material disposed at opposite sides of a deformable member having a permanent electric polarization which is adjacent to at least one electrically insulating compressible member, wherein the sensitive element is covered with a sheet of flexible and electrically insulating material.

10. A pressure transducer comprising at least two sensitive elements having a great length as compared with the larger size of the cross-section thereof, each sensitive element including two electrodes of a conducting material disposed at opposite sides of a deformable member having a permanent electric polarization which is adjacent to at least one electrically insulating compressible member.

11. A transducer according to claim 10, wherein the sensitive elements are associated to masses of heavy material, secured to one face thereof.

12. A pressure transducer comprising at least one sensitive element including two electrodes of a conducting material disposed at opposite sides of a deformable member having a permanent electric polarization which is adjacent to a flexible sheet of elastic material provided with recesses.

13. A pressure transducer according to claim 12, wherein said recesses are perforations extending through said flexible sheet.

14. A pressure transducer comprising at least one sensitive element including two electrodes of a conducting material disposed at opposite sides of a deformable member having a permanent electric polarization which is adjacent to a flexible sheet made of woven material.

15. A pressure transducer comprising at least one pair of sensitive elements, each provided with two electrodes of a conducting material disposed at opposite sides of a deformable member having a permanent electric polarization which is adjacent to at least one electrically insulating compressible member, the sensitive elements being separated by an insulating member, the respective electrodes of said sensitive elements being at opposite polarities.

16. A pressure transducer comprising at least one sensitive element including two electrodes of a conducting material disposed at opposite sides of a deformable member having a permanent electric polarization which is adjacent to at least one electrically insulating compressible member, said sensitive element being helically wound around a central core of great length, made of a flexible and electrically insulating material.

17. A pressure transducer comprising at least one sensitive element including a first electrode which is a cylindrical core of conducting material, a deformable member having a permanent electric polarization which is adjacent to at least one electrically insulating compressible member, and a second electrode, both electrodes sandwiching the assembly of the deformable member and of the compressible member.

18. A pressure transducer comprising at least one pair of sensitive elements including two electrodes of a conducting material disposed at opposite sides of a deformable member having a permanent electric polarization which is adjacent to at least one electrically insulating compressible member, both elements of the pair being helically wound in helices of opposite directions around an electrically insulating central core.

19. A pressure transducer comprising at least one sensitive element including two electrodes of a conducting material disposed at opposite sides of a deformable member having a permanent electric polarization which is adjacent to at least one electrically insulating compressible member, the sensitive element being narrower at its end portions than at the central portion thereof.

20. A pressure transducer comprising at least one sensitive element including two electrodes of a conducting material disposed at opposite sides of a deformable member having a permanent electric polarization which is adjacent to at least one electrically insulating compressible member, said sensitive element being helically wound around a central core of great length, made of a flexible and electrically insulated material, the winding pitch of the sensitive element being smaller at the central portion than at the end portions of the transducer.

21. Transducing device comprising at least one sensitive element including a first supporting electrode made of a flexible and locally rigid plate and a second electrode, said first and second electrodes being placed at opposite sides of a deformable element having a permanent electric polarization and an adjacent electrically insulating compressible element, said compressible element being capable of undergoing a substantial volume reduction in response to stresses, and said deformable element being placed in contact with said first supporting electrode.

22. A transducing device according to claim 21, in which the second electrode is entirely metallic.

23. A transducing device according to claim 21, in which the second electrode consists of a metal deposit on one of the faces of a strip of small thickness made of plastic material.

24. A transducing device according to claim 21, in which the compressible element consists of a strip made of rigid and regularly punched material.

25. A transducing device according to claim 21, in which the compressible element consists of a strip having a lattice structure.

26. A transducing device according to claim 21, in which several sensitive elements are electrically interconnected.

27. A transducing device according to claim 21, in which at least one sensitive element is helically wound around a central core.

28. A transducing device according to claim 21, wherein said sensitive element is enclosed by a flexible and electrically insulating material.

29. A transducing device according to claim 21, wherein several sensitive elements are superimposed and electrically interconnected.

30. A tranducing device according to claim 21, wherein a pair of said sensitive elements are separated by an insulating element, and respective electrodes of said sensitive elements are at opposite polarities.

31. A transducing device according to claim 21, wherein a pair of said sensitive elements are connected by a flexible support, and respective electrodes of said sensitive elements have the same polarity.

32. A transducing device according to claim 31, wherein said sensitive elements have a curved shape.

33. A transducing device according to claim 31, wherein said sensitive elements are connected in series.

34. A transducing device according to claim 31, wherein said sensitive elements are connected in parallel.

35. A transducing device according to claim 21, wherein said sensitive element is cylindrical, and is disposed on a central core of a flexible insulating material.

36. A tranducing device according to claim 21, wherein said first supporting electrode is a cylindrical core of conducting material, and said deformable element, said compressible element and said second electrode are helically wound around said cylindrical core.

37. A transducing device according to claim 21, wherein a pair of said sensitive elements are helically wound in helices of opposite directions around an electrically insulating central core.

38. A transducing device according to claim 21, wherein masses of heavy material are secured to one surface of said sensitive element.

39. A transducing device according to claim 21, wherein said sensitive element is narrower at end portions than at the central portion.

40. A transducing device according to claim 21, wherein said sensitive element is helically wound aroud a flexible and insulating central core of great length at a winding pitch smaller at the center than the ends of said core.

41. A transducing device comprising at least one sensitive element including two electrodes placed at opposite sides of a deformable element having a permanent electric polarization, one of said two electrodes being an incompressible and imperforate supporting metal plate provided with inequalities regularly distributed on the surface thereof facing the deformable element.

42. A transducing device according to claim 28, in which the inequalities on the surface are formed by a material deposited on a flat strip of the metal plate.

43. A transducing device according to claim 28, in which the electrode having inequalities on the surface consists of a flat strip of the metal plate whose surface facing the deformable element is engraved.

* * * * *